United States Patent [19]

Mack et al.

[11] 4,051,474
[45] Sept. 27, 1977

[54] INTERFERENCE REJECTION ANTENNA SYSTEM

[75] Inventors: Richard B. Mack, Winchester; John A. Strom, Nabnassett; Anthony Martinez, Westford, all of Mass.

[73] Assignee: The United States of America as represented by the Secretary of the Air Force, Washington, D.C.

[21] Appl. No.: 549,403

[22] Filed: Feb. 18, 1975

[51] Int. Cl.$^2$ .............................................. H04B 7/00
[52] U.S. Cl. ...................... 343/100 LE; 343/100 PE; 343/756
[58] Field of Search ............... 343/100 PE, 100 LE, 343/100 R, 756; 333/21 A

[56] References Cited
U.S. PATENT DOCUMENTS

| 3,176,297 | 3/1965 | Forsberg | 343/100 R |
| 3,710,329 | 1/1973 | Mailloux et al. | 343/100 R |

OTHER PUBLICATIONS

The Radio Amateur's Handbook, Amer. Radio Relay League, Newington, Conn., pp. 611 & 612.

Primary Examiner—Maynard R. Wilbur
Assistant Examiner—T. M. Blum
Attorney, Agent, or Firm—Joseph E. Rusz; Willard R. Matthews, Jr.

[57] ABSTRACT

Interference from polarized signals is minimized by controlling the polarization of antennas having orthogonal dipole radiating elements. The antenna system utilizes microwave hybrids and phase shifters in a coaxial cable feed circuit that divides the power between horizontal and vertical dipole radiating elements. The circuit provides a variable antenna polarization that can be controlled to discriminate against interfering signals having any given polarization characteristics. Coaxial double folded baluns connect feed circuits to the dipole radiating elements and provide proper phasing and impedance transformation for efficient dipole operation.

3 Claims, 10 Drawing Figures

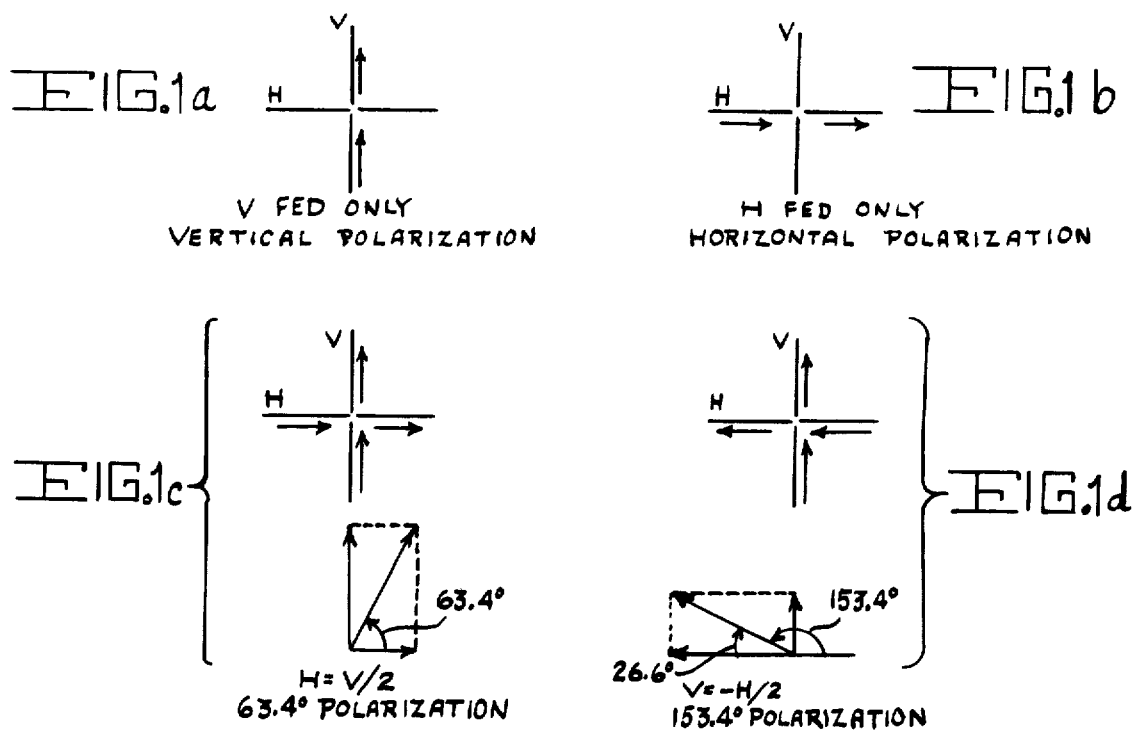
FIG.1a V FED ONLY VERTICAL POLARIZATION
FIG.1b H FED ONLY HORIZONTAL POLARIZATION
FIG.1c H=V/2 63.4° POLARIZATION
FIG.1d V=-H/2 153.4° POLARIZATION
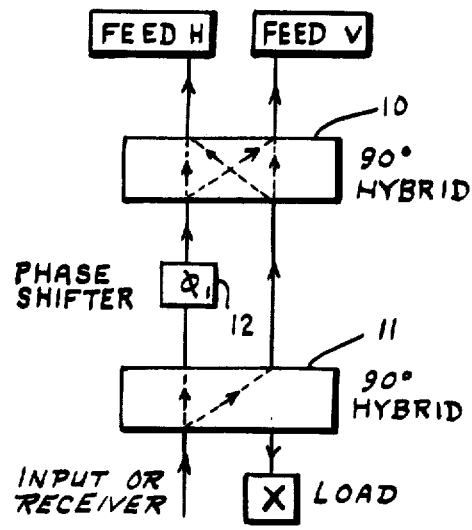
FIG.2

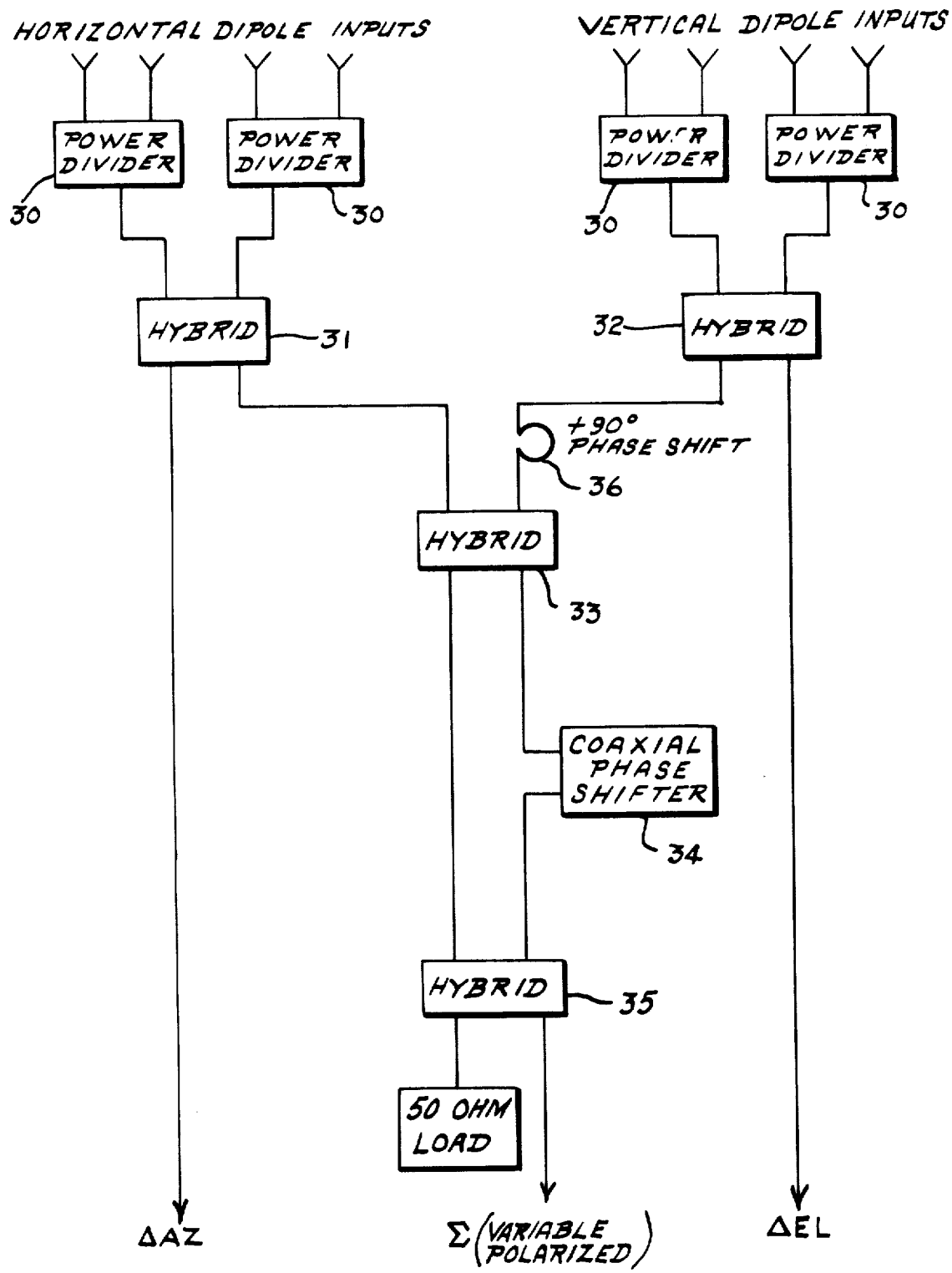

INTERFERENCE REJECTION ANTENNA SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to antenna systems having means for rejecting unwanted interference signals, and in particular to systems of that type that are suitable for monopulse radar applications and that utilize coaxial cable circuitry and orthogonal dipole radiating elements.

The capability for polarization control in antennas offers obvious advantages not only for such applications as optimizing signal strength over communication paths and reducing the scintillations of signals from radar targets, but also for receiving a desired signal while rejecting interfering ones of a differing polarization. In the past, however, the complications of achieving variable polarization have prohibited realization of its advantages in phased arrays. Recently an electronic method has been developed that is sufficiently simple for use in phased arrays. With this new method, the polarization of phased arrays can be rapidly varied through any linear, either circular, and even general elliptical forms.

Although such a method, in principle, expands the utility of interference rejection systems, to date, implementation of the method has been realized only with slot antennas and waveguide feed circuits. In order to effectively apply such techniques to monopulse radar systems considerable circuit simplification is required. Furthermore, means for effecting the results of this method with coaxial cable circuits and separately fed orthogonal dipole antenna elements are essential to such simplification. Such means are not now available. There currently exists, therefore, the need for apparatus and techniques effective to provide simplified interference rejection capabilities in phased array antenna systems and in monopulse radars. The present invention is directed toward satisfying this need.

SUMMARY OF THE INVENTION

The invention comprehends an interference rejection antenna system that discriminates against unwanted interfering signals by controlling the polarization of the antenna radiating elements to maintain antenna polarization is orthogonal relationship to the polarization of the unwanted interfering signals. Apparatus for accomplishing this includes antenna radiating elements consisting of separately fed crossed horizontal and vertical dipoles, a coaxial cable feed circuit having microwave hybrids that divide and combine electromagnetic wave energy transmitted to and from the horizontal and vertical dipoles, phase shifting means that control the ratio of transmitted electromagnetic wave energy, and baluns that provide efficient transformation from the unbalanced coaxial input to a balanced system at the dipole input terminals.

It is a principal object of the invention to provide a new and improved interference rejection antenna system.

It is another object of the invention to provide an interference rejection antenna system having both polarization control and dual monopulse radar application capability.

It is another object of the invention to provide an interference rejection antenna system of the type described that utilizes coaxial cable feed circuits and dipole antenna radiating elements.

These, together with other objects, features and advantages of the invention, will become more readily apparent from the following detailed description when taken in conjunction with the illustrative embodiment in the accompanying drawings.

DESCRIPTION OF THE DRAWINGS

FIG. 1a through 1d illustrate, schematically, the field components of a crossed dipole antenna element for various driving conditions;

FIG. 2 is a block diagram of a feed circuit capable of producing any linear polarization;

FIG. 7 is a block diagram of a multielement receiving circuit for the antenna array of FIG. 3.

DETAILED DESCRIPTION OF THE PREFERRED EMBODIMENT

Figure 3:
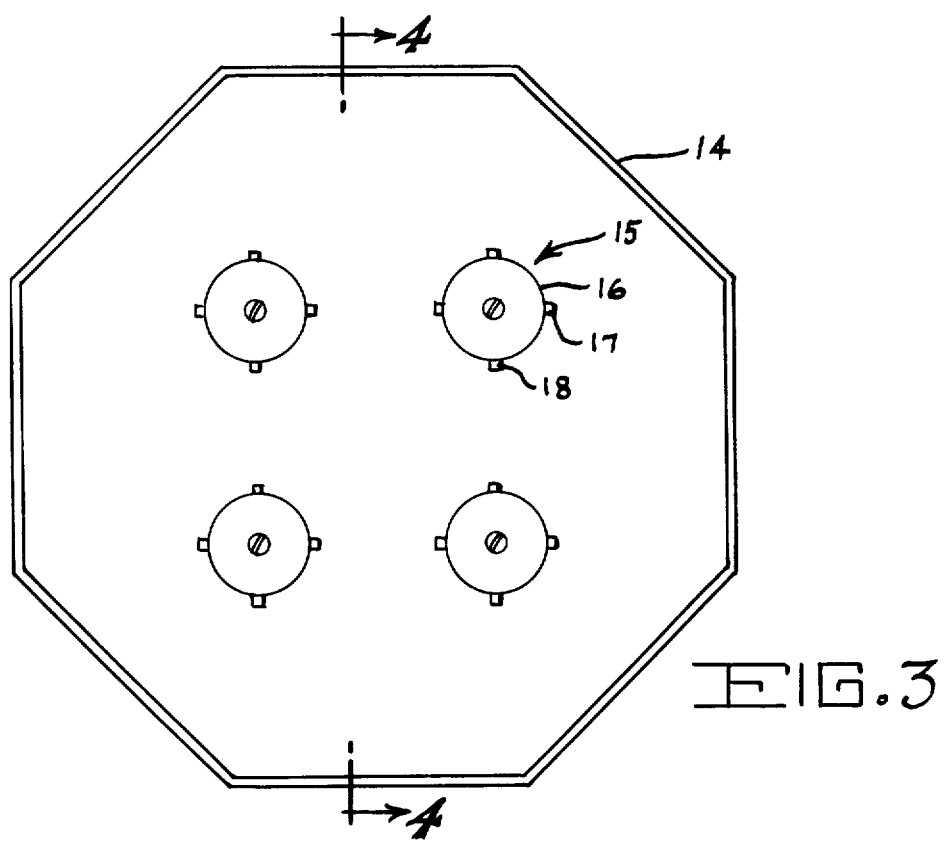
FIG. 3 is a front view of a four-element antenna array utilized in one embodiment of the invention.

The basis of the method of polarization control utilized by the invention can best be understood from the sketches of FIGS. 1a-1d. In FIGS. 1a -1d, pairs of crossed dipoles labeled V and H are shown with arrows indicating the instantaneous direction of current flow along the dipole for various driving conditions. Components of the corresponding far-field electric fields and their resultant summations are also shown. FIGS. 1a and 1b illustrate the obvious fact that if power is fed only to the vertical dipole, the polarization is vertical, and if power is fed only to the horizontal dipole thd polarization is horizontal.

As long as there is no relative phase difference between the dipoles, an intermediate division of power produces as intermediate linear polarization. Consider FIG. 1c. Here the two radiators are excited in phase but the amplitude of H is only half that of V. The resultant polarization is determined by finding the vector sum of the H and V components to be 63.4° from the horizontal. Similarly, equal in-phase excitation produces 45° polarization and for any amplitude ratio of V to H, the polarization tilt angle, $\theta$, with respect to the horizontal is given simply by $$\theta = \tan^{-1} V/H. \tag{1}$$

A convenient power-dividing network that permits continuous variation of the feeding ratio and hence provides for any desired linear polarization angle from vertical horizontal is shown in FIG. 2. This network consists of two 90° hybrids 10, 11 with one side joined by a variable phase shifter 12. For an input signal $e_i$ the output signals to the vertical and horizontal radiators are $$e_V = (e_i/2) A \sin \theta/2, \tag{2a}$$

$$e_H = (e_i/2) A \cos \theta/2, \tag{2b}$$

where $\theta$ is the phase angle introduced by the phase shifter. From Equation (1) the polarization angle $\theta$ is related to the electrical angle $\theta$ introduced by the phase shifter by $$\tan \theta = (\sin \phi/2)/(\cos \phi/2), \quad (3)$$

so that the phase angle required to produce a given linear polarization angle is given by $$\theta = 2 \theta. \quad (4)$$

Thus, adjustment of the phase shifter to $\phi = 0°$ directs all power to the horizontal element; a setting of $\phi = 90°$ divides the power equally between the horizontal and vertical elements; and a setting of $\phi = 180°$ feeds all power to the vertical element.

If the antenna is to be an array of several crossed dipoles the boxes labeled Feed H and Feed V in FIG. 2 are each power dividers feeding equal power to all of the horizontal and all of the vertical radiators respectively. These elements should introduce no additional relative phase shift.

FIG. 1d illustrates relative amplitudes that yield a polarization orthogonal to that of FIG. 1c. Values of V and H are interchanged for the orthogonal polarization and, in addition, the H value is negative. This negative value means that the feeding network must contain provision for introducing a phase shift of 180° between the vertical and horizontal components if all linear polarization angles are to be available.

If a second variable phase shifter is added between the top hybrid either the Feed H or the Feed V boxes in FIG. 2, a complete generality including either circular or any elliptical becomes available. If this phase shifter has only fixed settings of 90°, 180°, and 270° any linear and either circular polarization becomes available. For the latter case that requires only fixed settings, ferrite phase shifters are attractive because these are easily controlled from a remote operator location.

It is also apparent that orthogonal polarizations are rejected with this procedure. Consider linear polarization and let the phase shifter of the feeding network of FIG. 2 be set at a value of $\phi_1°$. The crossed dipoles will then have maximum sensitivity to an incident wave polarized at an angle of $\theta = \phi_1/2$. With this setting of the phase shifter maintained, let a wave of orthogonal polarization, $\theta = (\phi_1/2 + 90°)$, be incident on the dipoles. The resultant components on the dipoles will be $$e_H = -e_i \sin(\phi_1/2), \quad (5a)$$

$$e_V = e_i \cos(\phi_1/2), \quad (5b)$$

where $e_i$ is the amplitude of the incident field at the dipoles. Tracing the path of these components through the feeding network shows that the outputs from the hybrid nearest the dipoles will be $$e_H = (e_i/2) [-\sin(\phi_1/2) - j \cos(\phi_1/2)], \quad (6a)$$

$$e_V = (e_i/2) [\cos(\phi_1/2) - j \sin(\phi_1/2)]. \quad (6b)$$

At the input to the second hybrid the signals are $$e_H = (e_i/2) [-\sin(\phi_1/2) + j \cos(\phi_1/2)], \quad (7a)$$

$$e_V = (e_i/2) [\cos(\phi_1/2) - j \sin(\phi_1/2)] e^{j\phi_1}. \quad (7b)$$

After passing through the second ybrid the combined signal at the receiver port is $$e_r = \frac{e_i}{4} [(\cos(\phi_1/2) - j \sin(\phi_1/2))e^{j\phi_1} - j \sin(\phi_1/2)$$

$$- \cos(\phi_1/2)],$$

$$= \frac{e_i}{4} [\cos(\phi_1 - \phi_1/2) + j \sin(\phi_1 - \phi_1/2) - \cos(\phi_1/2)$$

$$- j \sin(\phi_1/2)],$$

$$= \frac{e_i}{4} [\cos(\phi_1/2) + j \sin(\phi_1/2) - \cos(\phi_1/2)$$

$$- j \sin(\phi_1/2)],$$

$$= 0. \quad (8)$$

Thus, the electrical paths through the power-dividing network are just correct to make components of the orthogonal polarization cancel at the receiver port.

Figure 4:
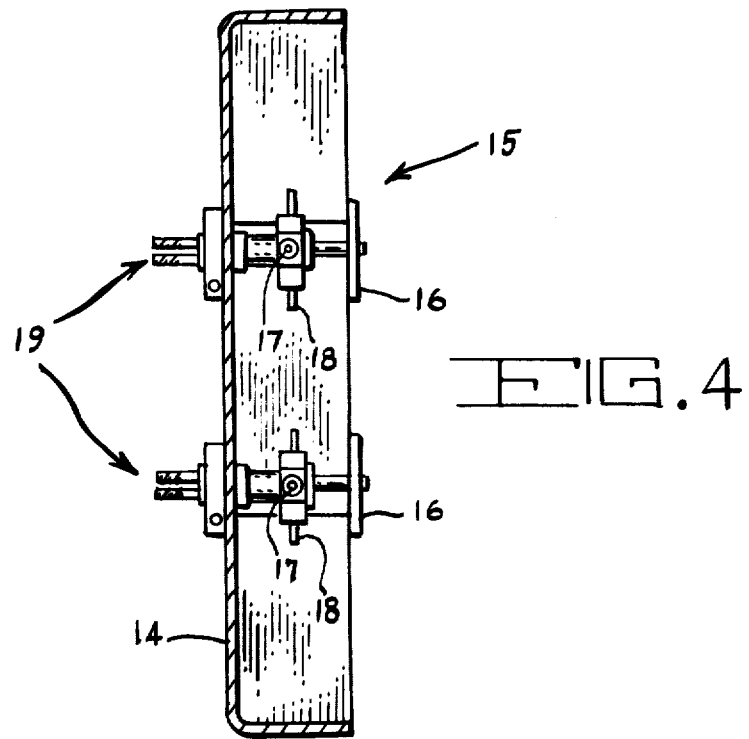
FIG. 4 is a sectional view of FIG. 3 taken at 4—4.

A multielement antenna adapted to use in conjuction with the polarization controlcircuits of the present invention is illustrated by FIGS. 3 and 4. This array consists of four individual short backfire radiating elements 15 with separately fed orthogonal outputs 19 backed by a common flat reflector 14 having an octagonal contour. The short backfire elements 15 comprise horizontal dipoles 17 and vertical dipoles 18 arranged in orthogonal crossed relationship together with secondary disk reflector 16.

Figure 5:
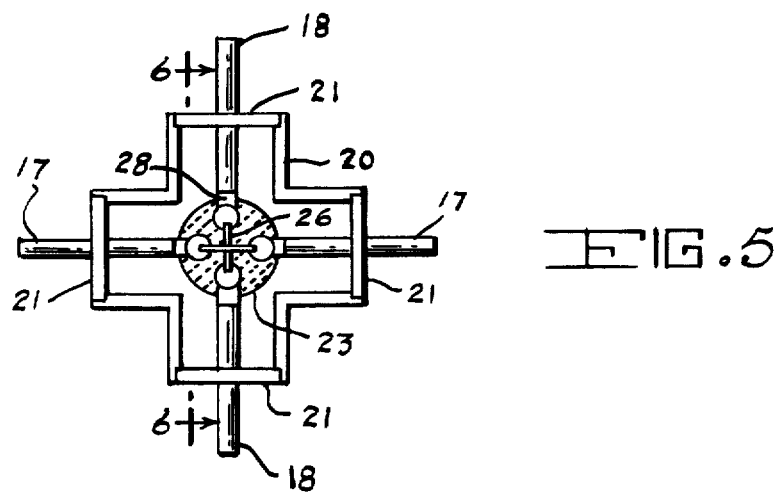
FIG. 5 is a front view detail (cover removed) of one crossed dipole assembly utilized in the array of FIG. 3.
Figure 6:
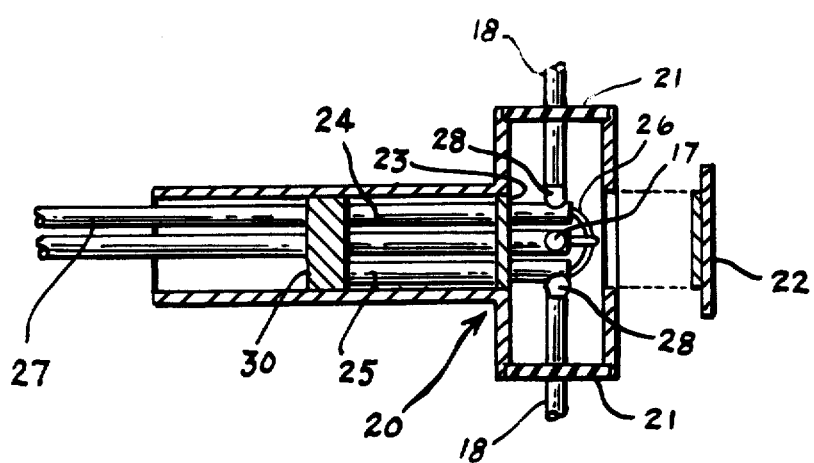
FIG. 6 is a sectional view of FIG. 5 taken at 6—6.

The multielement antenna feed mechanism is illustrated by FIGS. 5 and 6 and consists of the orthogonal dipoles 17, 18 incorporated in a cross shaped aluminum enclosure and support tube 20. The dipoles are isolated from support tube 20 by means of insulating disks 21 and coaxial cable feeds are maintained in place by dielectric spacer 23. A cover plate 22 is provided for the cross shaped aluminum enclosure.

A coaxial double-folded balun network is inserted into the aluminum feed enclosure and is located so that dipole elements may be adapted to the balanced outputs of the baluns. The baluns provide proper phasing and impedance transformation for efficient dipole operation in the presence of the cavity reflectors.

With this type of balun, transformation from unbalanced coaxial input to a balanced system at the dipole input terminals is accomplished by enclosing the final quarter wavelength of the coaxial line 24 with a like single quarter wavelength stub 25 and connecting the center conductor 26 of the coaxial line 27 to the outer conductor of the stub. The final quarter wavelength of coaxial line 24 is defined by means of shorting means 30. Symmetry is obtained by the use of this stub with the dipoles connected to both outer shields by means of dipole adaptors 28. This procedure is, of course, performed twice for each element of the array to take care of each dipole of the orthogonal set.

A block diagram of a microwave receiving network for producing sum and difference outputs with variable line polarization in the antenna illustrated in FIGS. 3 and 4 is given in FIG. 7. It comprises hybrids 31, 32, 33, 35, and phase shifters 34, 36. Equal power division between dipole elements is provided by power divider 30. Either quadrature or 180° hybrids can be used. If the quadrature hybrids of FIG. 2 are replaced by 180° hybrids, an additional quarterwave section of connecting transmission line is required. Except for a small degradation due to the fixed line being λ/4 at the center frequency the control units provides the same capabilities as one with quadrature hybrids.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. An interference rejection antenna system comprising at least one antenna radiating lement, each radiating element comprising a vertical dipole and a horizontal dipole disposed in crossed planar relationship, a coaxial feed for each dipole, a balun connecting each dipole with a coaxial cable feed, each said balun comprising shorting means connected to provide a quarter wavelength termination extension of a coaxial cable feed, a quarter wavelength coaxial cable stub is spaced juxtaposition with said quarter wavelength termination extension and terminating on said shorting means, the center conductor of said coaxial cable feed being connected to the outer conductor of said quarter wavelength coaxial stub, and means for connecting dipole segments to the outer conductors of said quarter wavelength termination extension and said quarter wavelength coaxial stub, and a power dividing network connected to said coaxial cable feeds effective to control the ratio of electromagnetic wave energy propagating through vertical and horizontal dipoles.

2. An interference rejection antenna system as defined in claim 1 wherein said power dividing network comprises a first microwave hybrid adapted to divide and combine electromagnetic wave energy transmitted to and from said vertical and horizontal dipoles, a second microwave hybrid adapted to divide and combine electromagnetic wave energy transmitted to and from said first microwave hybrid, and a phase shifter connected between said first and second microwave hybrids.

3. An interference rejection antenna system as defined in claim 2 including a second phase shifter connected between said first microwave hybrid and one commonly oriented group of dipoles.

* * * * *